US011224091B2

United States Patent
Nanjundappa et al.

(10) Patent No.: US 11,224,091 B2
(45) Date of Patent: Jan. 11, 2022

(54) METHOD AND APPARATUS FOR PRIORITIZING MISSION CRITICAL PUSH TO TALK TRAFFIC DURING AN EMERGENCY

(71) Applicant: SAMSUNG ELECTRONICS CO., LTD., Gyeonggi-do (KR)

(72) Inventors: Arjun Nanjundappa, Bangalore (IN); Basavaraj Jayawant Pattan, Bangalore (IN); Lalith Kumar, Bangalore (IN); Avinash Bhat, Bangalore (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/044,699

(22) PCT Filed: Jul. 26, 2019

(86) PCT No.: PCT/KR2019/009343
§ 371 (c)(1),
(2) Date: Oct. 1, 2020

(87) PCT Pub. No.: WO2020/022840
PCT Pub. Date: Jan. 30, 2020

(65) Prior Publication Data
US 2021/0045185 A1     Feb. 11, 2021

(30) Foreign Application Priority Data

Jul. 26, 2018   (IN) .............................. 201841028218
Jul. 22, 2019   (IN) .............................. 201841028218

(51) Int. Cl.
*H04W 76/50*     (2018.01)
*H04W 4/90*      (2018.01)
(Continued)

(52) U.S. Cl.
CPC ........... *H04W 76/50* (2018.02); *H04W 4/023* (2013.01); *H04W 4/10* (2013.01); *H04W 4/90* (2018.02); *H04W 76/45* (2018.02)

(58) Field of Classification Search
CPC ....... H04W 4/10; H04W 76/50; H04W 76/45; H04W 4/90; H04W 4/023
See application file for complete search history.

(56) References Cited

U.S. PATENT DOCUMENTS 8,468,244 B2  6/2013  Redlich et al.
8,543,665 B2  9/2013  Ansari et al.
(Continued)

FOREIGN PATENT DOCUMENTS

| KR | 1020180029226 | 3/2018 |
| WO | WO2016111528  | 7/2016 |
| WO | WO2017142345  | 8/2017 |

OTHER PUBLICATIONS

Indian Examination Report dated Dec. 2, 2020 issued in counterpart application No. 201841028218, 6 pages.
(Continued)

*Primary Examiner* — Keith Ferguson
(74) *Attorney, Agent, or Firm* — The Farrell Law Firm, P.C.

(57) ABSTRACT

Methods and apparatuses for prioritizing Mission Critical Push to Talk Traffic during an emergency. Embodiments disclosed herein relate to wireless communication networks, and more particularly to mission critical services in Long Term Evolution (LTE) communication networks. Embodiments herein disclose a channel sensitive MCPTT prioritization scheduling method and system to increase the download/upload speeds for MCPTT users during the emergency
(Continued)

situations. Embodiments herein methods and systems for prioritizing traffic for connected User Equipments (UEs) over idle UEs.

20 Claims, 4 Drawing Sheets

(51) Int. Cl.
*H04W 76/45* (2018.01)
*H04W 4/02* (2018.01)
*H04W 4/10* (2009.01)

(56) References Cited

U.S. PATENT DOCUMENTS

| | | |
|---|---|---|
| 2017/0041752 A1 | 2/2017 | Baek et al. |
| 2017/0238359 A1* | 8/2017 | Atarius ................ G01S 7/4817 370/259 |
| 2018/0077552 A1 | 3/2018 | Lee et al. |
| 2018/0109972 A1 | 4/2018 | Kim et al. |
| 2018/0160277 A1 | 6/2018 | Patel et al. |
| 2018/0199288 A1 | 7/2018 | Cho et al. |
| 2018/0295556 A1 | 10/2018 | Baek et al. |

OTHER PUBLICATIONS

PCT/ISA/210 Search Report issued on PCT/KR2019/009343, dated Dec. 6, 2019, pp. 4.
PCT/ISA/237 Written Opinion issued on PCT/KR2019/009343, dated Dec. 6, 2019, pp. 5.

* cited by examiner

```
Receiving signaling from at least one
User Equiment, with user buffer occupancy    — 402
                    ↓
Calculating priority metric value in MAC layer  — 404
                    ↓
Selecting candidates based on number of
schedulable users                             — 406
                    ↓
Allocating downlink resources and
updating buffer occupancy status              — 406
```

[Fig. 5]

| Parameters | Value |
|---|---|
| Channel Bandwidth | 20MHz |
| Carrier Frequency | Band 28 |
| Transmit Power | 40 W(46 dBm) |
| Reference signal power | 21 dBm |
| Antenna gain | 15 dBi |
| Resource Scheduling | Proportional Fairness |
| MIMO | 4 x 4 MIMO |
| UE count | 50 |
| MCPTT priority | High/Mid |

[Fig. 6]

| Path loss for MCPTT UE | 31.54 + 40 log2d |
|---|---|
| Uplink Scheduler | Proportional Scheduler |
| Packet Generation Rate | Exponential(mean 10sec-30min) |

[Fig. 7]

| User | Conventional Method (Mbps) | Proposed Method (Mbps) |
|---|---|---|
| MCPPT User | 10.8 | 19.31 |
| Non-MCPTT User | 12.8 | 5.2 |

[Fig. 8]

| User | Conventional Method (Mbps) | Proposed Method (Mbps) |
|---|---|---|
| MCPPT User | 9.5 | 15.96 |
| Non-MCPTT User | 9.5 | 5.7 |

METHOD AND APPARATUS FOR PRIORITIZING MISSION CRITICAL PUSH TO TALK TRAFFIC DURING AN EMERGENCY

PRIORITY

This application is a National Phase Entry of PCT International Application No. PCT/KR2019/009343, which was filed on Jul. 26, 2019, and claims priority to Indian Patent Application No. 201841028218 (PS), which was filed on Jul. 26, 2018, and Indian Patent Application No. 201841028218 (CS), which was filed on Jul. 22, 2019, the contents of each of which are incorporated herein by reference.

TECHNICAL FIELD

The present disclosure relates to wireless communication networks, and more particularly to mission critical services in Long Term Evolution (LTE) communication networks.

BACKGROUND ART

In the event of a natural disaster, or a man-made disaster, mission critical services are to be provided with highest priority for those who are affected. For example, a civilian with a User Equipment (UE), such as a cell phone, stuck in an earthquake may require emergency assistance. In such situations, the service priority has to be updated in real time so as to allocate more radio resources to mission critical services.

Mission Critical Push to Talk (MCPTT) in Third generation Partnership Project (3GPP) provides a method for two or more users to engage in communication during the emergency situation. MCPTT aims for both high reliability and low latency for mission critical services and public safety applications. The MCPTT service is built over the existing 3GPP communication architecture and the available radio resources are shared among the users of network traffic. MCPTT services have to provide for the better management of mission critical operations during the emergency scenarios.

Mission-critical push-to-talk (MCPTT) over Long Term Evolution (LTE), or MCPTT over LTE, is an LTE feature that was introduced in Release 13 in 2016 as the Third generation Partnership Project (3GPP) sought to include LTE features that allowed the technology to better address the needs of first responders and other mission critical communications users. MCPTT over LTE is defined as push-to-talk functionality that meets the requirements of public safety mission-critical voice communication, which include high availability/reliability, low latency, support for group calls and one-to-one calls, talker identification, device-to-device direct communications, emergency calling, clear audio quality, etc.

In the event of an emergency situation, it is likely that a large number of people in the affected area would be trying to access the communication network looking for help. This high demand would lead to a high traffic or load on the network leading to radio link failure for a number of citizens.

First responders, such as firemen and ambulance services, have devices which are MCPTT enabled. But the first responders may not be available in an emergency scenario as they might take time to arrive. However, the sharing of resources can result in insufficient allocation of resources to MCPTT users during the emergency situation. Additionally, a high number of users using MCPTT service during the emergency situation can also result in a smaller available download/upload speed for each MCPTT user.

The Standard Specification gives high priority access to the first responders, such as firemen, ambulance services, and the like, to ensure this network traffic does not hinder the operation of rescue or other services provided by the first responders. But, considering the fact that a first responder would not be available in every location at all times, the MCPTT system gives a priority access to the network resources to such a person who is not even in the vicinity to be of any help to the needy in those critical hours of need or rescue, thus making all the affected people dependent on the presence of the first responders to arrive at the affected location to help them.

Furthermore, recent advances in video streaming applications are also helping in mission critical situations. For example, policemen and firefighters are required to stream the disaster situation live to the service headquarters for better coordination and actions. However, video applications require much higher bandwidth usage than the voice applications and therefore sufficient radio resources are required for the mission critical services. Hence, a proper management of MCPTT resources is required.

In order to support multiple services, Radio Resource Management (RRM) procedure in Long Term Evolution (LTE) provides a framework to improve the performance of the overall system. RRM also includes dynamic scheduling of users in both time and frequency domain. However, the scheduling algorithms are not defined in 3GPP and hence they are of key interest to the research community. The scheduling algorithms are usually classified as channel dependent and channel sensitive. Examples of channel dependent scheduling algorithms include First-in-First-out (FIFO), Round Robin (RR) and examples of channel sensitive scheduling algorithm include Proportional Fairness (PF), Generalized Proportional Fair (GPF), and so on.

DISCLOSURE OF INVENTION

Technical Problem

Embodiments of the present disclosure provide methods and apparatuses for prioritizing Mission Critical Push to Talk Traffic (MCPTT) in a MCPTT, during an emergency situation.

The embodiments of present disclosure provide channel sensitive MCPTT prioritization scheduling methods and apparatuses to increase the download/upload speeds for MCPTT users during the emergency situations.

The embodiments of present disclosure provide methods and apparatuses for prioritizing traffic for connected User Equipments (UEs) over idle UEs as well as over connected UEs.

Solution to Problem

Accordingly, the embodiments herein disclose a method for access prioritization in a Mission Critical Push to Talk (MCPTT) network. A dispatcher detects an occurrence of an emergency in a location of a Mission Critical Services (MCX) zone. The dispatcher detects presence of at least one first responder device for the emergency in close proximity from the location of the emergency. The dispatcher determines distance of the at least one first responder device from the location of the detected emergency. The dispatcher prioritizes in the emergency location, an access to the MCPTT network for at least one User Equipment (UE) device other than the at least one first responder device, if the at least one first responder device is at a distance more than a pre-determined distance from the location of the detected emergency.

Accordingly, the embodiments herein disclose a method for prioritizing at least one User Equipment (UE) device in connected mode in a Mission Critical Push to Talk (MCPTT) network. A scheduler receives signaling from the at least one UE, with user buffer occupancy. A priority metric value in MAC layer is calculated. The priority metric value is allocated for each user in the MCPTT network. Candidates are selected based on a number of schedulable users. Downlink resources are allocated and buffer occupancy status is updated.

Accordingly, the embodiments herein provide a method for access prioritization in a Mission Critical Push to Talk (MCPTT) network. A user provides an indication that a request for one of establishing and resuming Radio Resource Control (RRC) connection is for mission critical services. A gNodeB prioritizes the RRC connection request with an indication having mission critical service and establishes access connection over a plurality of RRC connection requests from other device in the MCPTT network.

Accordingly, the embodiments herein disclose an apparatus for access prioritization in a Mission Critical Push to Talk (MCPTT) network. A dispatcher detects an occurrence of an emergency in a location of a Mission Critical Services (MCX) zone. The dispatcher detects presence of at least one first responder device for the emergency in close proximity from the location of the emergency. The dispatcher determines a distance of the at least one first responder device from location of the detected emergency. The dispatcher prioritizes in the emergency location, an access to the MCPTT network for at least one User Equipment (UE) device other than the at least one first responder device, if the at least one first responder device is at a distance more than a pre-determined distance from the location of the detected emergency.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments disclosed herein are illustrated in the accompanying drawings, throughout which like reference letters indicate corresponding parts in the various figures. The embodiments herein will be better understood from the following description with reference to the drawings, in which.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Mission-critical push-to-talk (MCPTT) over Long Term Evolution (LTE), or MCPTT over LTE, is an LTE feature that was introduced in Release 13 in 2016 as the Third generation Partnership Project (3GPP) sought to include LTE features that allowed the technology to better address the needs of first responders and other mission critical communications users. MCPTT over LTE is defined as push-to-talk functionality that meets the requirements of public safety mission-critical voice communication, which include high availability/reliability, low latency, support for group calls and one-to-one calls, talker identification, device-to-device direct communications, emergency calling, clear audio quality, etc.

The embodiments herein disclose a method for access prioritization in an MCPTT network. The embodiments herein disclose a channel sensitive MCPTT prioritization scheduling method and apparatus to increase the download/upload speeds for MCPTT users during emergency situations. Embodiments herein disclose methods and apparatuses for prioritizing traffic for connected UEs over idle UEs as well as over connected UEs. Referring now to the drawings, and more particularly to FIGS. 1 through 10, where similar reference characters denote corresponding features consistently throughout the figures, there are shown at least one embodiment.

Embodiments herein include devices sending unique Logical Channel ID (LCID) values, establishment cause and priority metric with high weightage for MCPTT QoS Class Identifier (QCI) values.

Figure 1:
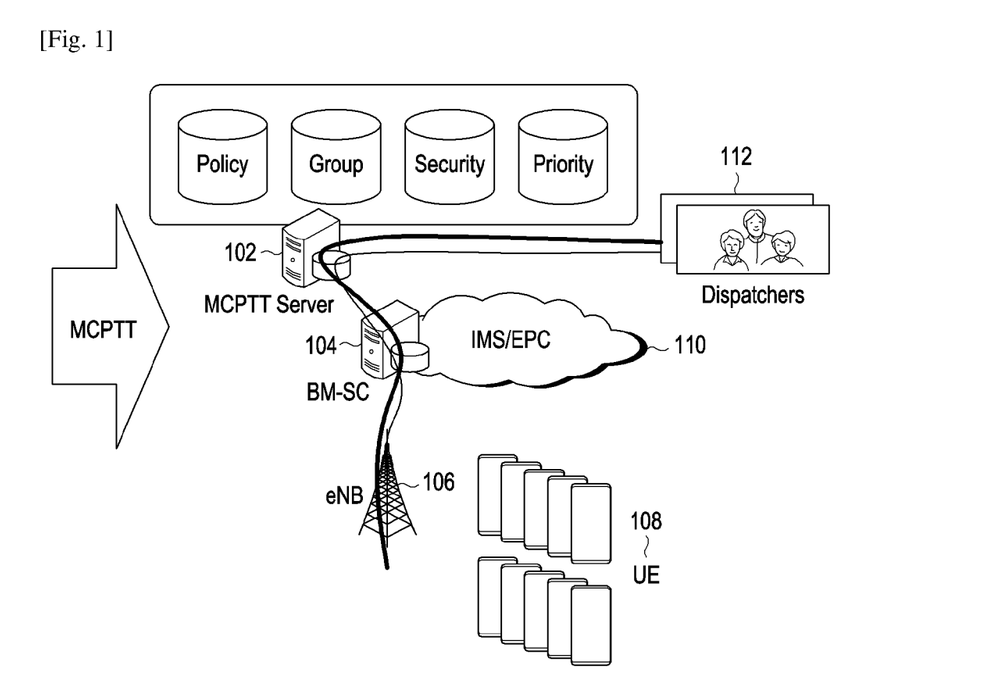
FIG. 1 depicts the Mission Critical Push to Talk Communication System, according to embodiments as disclosed herein.

FIG. 1 describes an MCPTT system. Some of the features of the MCPTT system include effective group communication across departments, multicast support through enhanced multimedia broadcast multicast service (eMBMS), and device to device (D2D) communication.

The MCPTT system 100 comprises a MCPTT server 102 which allows users to communicate over a LTE network in mission critical environments. The system 100 further comprises a Broadcast Multicast Service Center (BM-SC) 104. The BM-SC 104 is a source for Multimedia Broadcast Multicast Services (MBMS) data and may schedule data and receive data from third parties for transmission. The system 100 further comprises an eNodeB (eNB) 106. A UE device 108 can communicate with the other UE devices via an IMS-EPC (IP Multimedia Subsystem-Evolved Packet Core) 110 which delivers various services such as VoIP, SMS, Video call, sharing of pictures, instant messaging, and the like. Examples of the UE devices may be a laptop, a cellular phone, a PDA (Personal Digital Assistant), a smart phone, a multimedia device, a wearable device, an Internet of Things (IoT) device and other devices which may use MCPTT services. Embodiments herein refer to the UE device as a UE, a UE device, a device interchangeably to refer to the UE device 108. The system 100 may further comprise at least one first responder device.

The system 100 further comprises a dispatcher 112 which is a controller MC UE, authorized to create and control MC Groups. The dispatcher interfaces with an IP Multimedia Subsystem Call Session Control Function (IMS CSCF) directly. Long term Evolution Home Subscriber Server (LTE HSS) (not shown in FIG. 1) is provisioned with MC subscribers. Evolved Packet Core Mobility Management Entity (EPCs MME) is enhanced to support MC QCI for QoS Control. Serving/Packet Gateway (S/P-GW) (not shown in FIG. 1) is enhanced to support separate Mission Critical Packet Data Network (MC PDN) (not shown in FIG. 1). S/P-GW to act as MBMS-GW (not shown in FIG. 1) and interfaces with BM-SC for MCX Service. LTE eNB is enhanced to support MCX QCI and four new QCI values 65, 66, 69 and 70 are defined in 3GPP to handle the same.

Additionally, authorized Mission Critical (MC) users/dispatchers can form new groups by regrouping MC users from different set of pre-arranged mission critical service (MCX) groups.

Embodiments herein increase the MCPTT user traffic speed during an emergency situation. The dispatcher 112 is configured to detect an occurrence of an emergency based on network traffic data in a location of an MCX group. Further, the dispatcher 112 is configured to detect a presence of at least one first responder device in close proximity from the location of the emergency. The dispatcher 112 is configured to detect presence of at least one first responder device for the emergency in close proximity from the location of the emergency. Further, the dispatcher 112 is configured to prioritize the network access to UE devices other than the at least one first responder device in the emergency location if the first responder device is at a distance more than a pre-determined distance from the location of the emergency. The eNB 106 is configured to schedule resources to the UE devices 108 based on the connection requests received from the UE devices 108.

Figure 2:
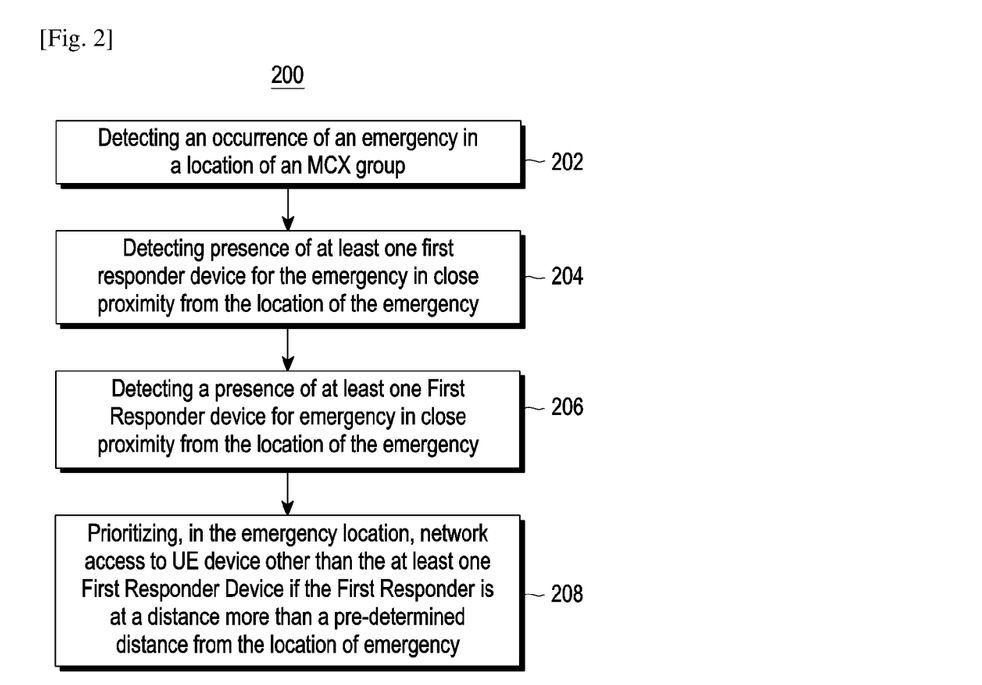
FIG. 2 depicts a method of access prioritization in an MCPTT network, according to embodiments as disclosed herein.

FIG. 2 illustrates a flowchart showing the method steps involved in access prioritization in an MCPTT network. At step 202, an occurrence of an emergency is detected by a dispatcher 112 based on network traffic data in a location of an MCX group. The emergency situation may be, for example, an earthquake, a tsunami, a terrorist attack, an accident, and so on. At step 204, the dispatcher 112 detects presence of at least one first responder device for the emergency in close proximity from the location of the emergency. At step 206, presence of at least one first responder device is detected by the dispatcher 112 in close proximity from the location of the emergency. The presence of the at least one first responder device in close proximity comprises calculating distance of the at least one first responder device from the emergency location and time required by the at least one first responder device to reach the emergency location. The current location of the first responder device(s) can be present in a database/storage. Suitable first responder devices can be determined based on the nature of emergency, access to the location of the emergency, and so on. At step 208, in the emergency location, the network access to UE devices other than the at least one first responder device is prioritized by the dispatcher 112 if the first responder device is at a distance more than a pre-determined distance from the location of the emergency. The pre-determined distance may be present in the database/storage. Each of the UE devices may be in one of idle mode and connected mode. The various actions in the flowchart 200 may be performed in the order presented, in a different order, or simultaneously. Further, in some embodiments, some actions listed in FIG. 2 may be omitted.

Figure 3:
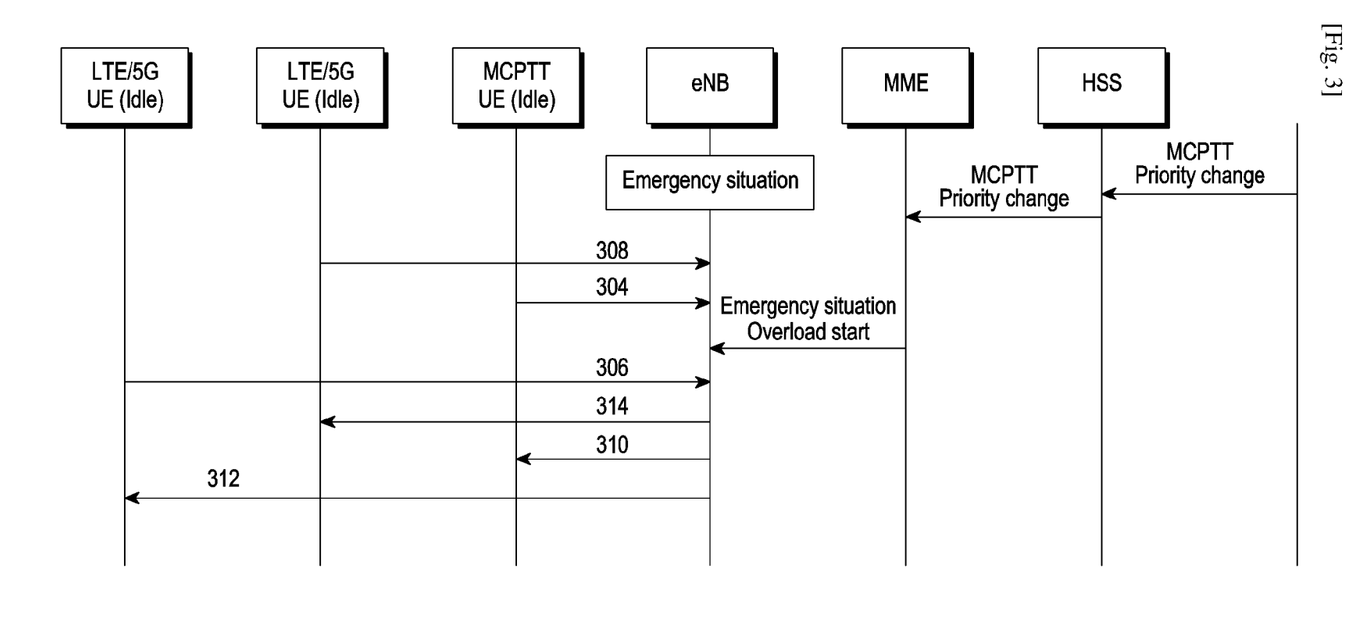
FIG. 3 depicts a process for prioritizing for MCPTT traffic, wherein the UEs are in idle mode, according to embodiments as disclosed herein.

FIG. 3 illustrates a flow diagram 300 showing the prioritization of MCPTT traffic for idle UEs with MCPTT traffic. A UE can be considered to be in idle mode is when there is no Radio Resource Control (RRC) established. A given cell within the location of emergency may comprise several UEs with idle mode UEs.

At step 302, on detecting the emergency situation, a request to change MCPTT user priority is sent to the MME through a command center or a dispatcher. At step 304, a user of MCPTT enabled devices, such as the first responder devices, sends a "RRC Connection Request" message with LCID value setting "01110" and establishment cause value set to mcs-PriorityAccess. At step 306, a user of another idle LTE 5G UE sends an establishment cause value set to mcs-PriorityAccess. At step 308, a user of an LTE/5G UE sends an establishment cause value set to moCall AC=0-9. At step 310, the eNB accepts the connection requests from the idle MCPTT enabled UE device whose establishment cause value is set to mcs-PriorityAccess. At step 312, the eNB 106 accepts connection requests from the idle LTE 5G device whose establishment cause value set to mcs-PriorityAccess. At step 314, the eNB 106 rejects the connection request from the idle LTE 5G device whose establishment cause value set to moCall AC=0-9. The values disclosed above are merely examples and the values may differ, as per pre-defined configuration(s), Therefore, during the emergency scenario, the idle devices which have set the establishment cause value to mcs-PriorityAccess are accepted by the eNB 106. On the other hand, the eNB 106 rejects connection requests from UEs which have set the establishment value to a different value. The various actions in the flowchart 300 may be performed in the order presented, in a different order, or simultaneously. Further, in some embodiments, some actions listed in FIG. 3 may be omitted.

Figure 4:
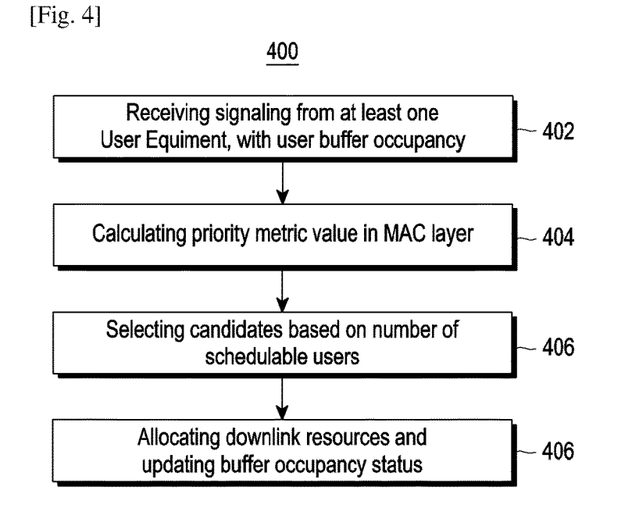
FIG. 4 depicts a process for prioritizing for MCPTT traffic, wherein the UEs are in connected mode, according to embodiments as disclosed herein.

During emergency scenarios, when a number of users are connected to a given network, embodiments herein identify users who require high priority in MCPTT traffic. A specific QCI value is associated with the mission critical server for which high priority may be given. Examples of the QCI values for which high priority may be given are 65, 66, 69, and 70, and these values pertain to MCPTT-enabled devices, such as the first responder devices. In the case of non-MCPTT enabled devices, such as an affected civilian's mobile phone, the QCI values can range between QCI 1 and 8. The values disclosed above are merely examples and the values may differ, as per pre-defined configuration(s), FIG. 4 depicts the process for prioritizing traffic for UEs in connected mode, i.e., for users having a UE which is non-MCPTT-enabled. At step 402, a scheduler located at the eNB 106 receives signaling from the UE, with the user buffer occupancy. When an RRC request is sent to the eNB 106, each user may have a priority associated with the buffer occupancy. The buffer occupancy is how much buffer has to be associated with a particular user.

At step 404, a Priority Metric value is calculated in the MAC layer based on channel quality indicator value (CQI), weight W1, packet delay budget, weight W2, QCI value, weight W3, buffer occupancy, weight W4, token priority, weight W5, based on the below equation.

$$UE_{Grant}^{i}(t)=F(CQI_i^t, BO_i^t, \text{Priority}_i^t)=\Sigma_K RB_k^{i,t}$$

Priority can be provided for users with pre-defined MCPTT QCI values. The priority metric value is allocated to each user so that the scheduler can decide which user obtains the highest priority. In an example, priority can be provided for users with MCPTT QCI values 65, 66, 69, and 70. Among these four QCIs, Priority Metric value is set high for QCI 65 (GBR MCPTT Voice Traffic) and QCI 69 (non-GBR MCSignaling).

At step 406, candidates are selected based on the number of schedulable users/TTI. In an example, a highest priority is provided to MCPTT UEs whose QCI value match 65 and 69. For prioritizing MCPTT QCI 65 and 69, the value W2 is increased to 75 ms and 60 ms and W3 to QCI 65 and 69 accordingly.

Once the five weights, w1, w2, w3, w4, and w5 are calculated, users may be scheduled, i.e., each user may be allocated a certain amount of radio resources based on the priority. The radio resources are measured in the form of Physical Resource Blocks (PRBs). At step 408, downlink resources are allocated and the buffer occupancy status is updated. The various actions in the flowchart 400 may be performed in the order presented, in a different order, or simultaneously. Further, in some embodiments, some actions listed in FIG. 4 may be omitted.

Figure 5:
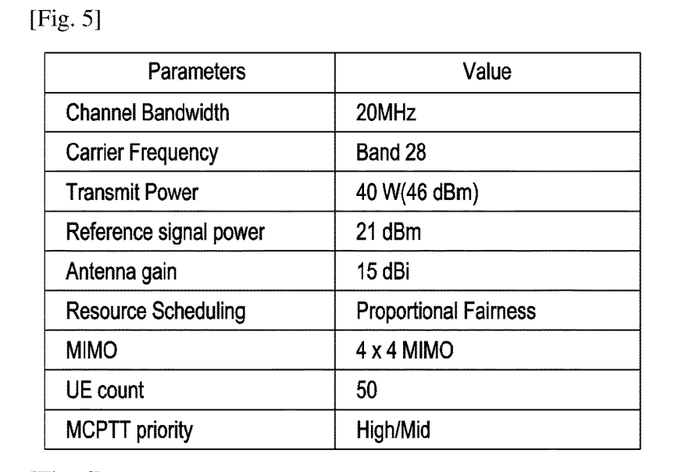
FIGS. 5 and 6 depict the simulation and device specific parameters respectively for evaluating the performance of MCPTT method with an LTE simulator using OPNET, according to embodiments as disclosed herein.
Figure 6:
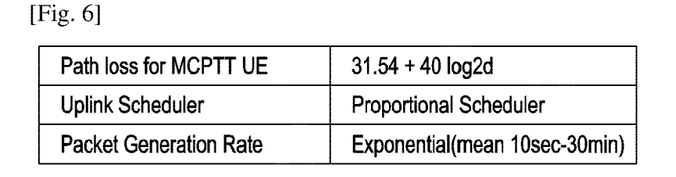

In an example, a channel bandwidth of 20 MHz is considered where 100 Physical Resource blocks (PRBs) are available for device resource allocation. A carrier frequency of Band 28 for 700 MHz band is used. This is the standard frequency for public safety LTE (PS-LTE) which provides higher coverage at lower frequencies. The other simulation parameters are shown in FIG. 5 and specific MCPTT device parameters are shown in FIG. 6. The performance of MCPTT method with LTE simulator using OPNET is evaluated. The simulation parameters are shown in FIG. 5.

Presently, LTE traffic allocates 16% of overall traffic to public safety traffic under normal operation. For 20 MHz, 16 PRBs are allocated to MCPTT traffic out of 100 PRBs in LTE Traffic. During the emergency situation, command center informs the HSS regarding the high priority for MCPTT user devices. According to embodiments as disclosed herein, MCPTT devices get the highest priority and almost all the 100 PRBs are allocated to public safety. Embodiments herein guarantee a higher number of PRBs allocated to the MCPTT and as a result, there is a substantial increase in both the upload and download speeds.

Figure 7:
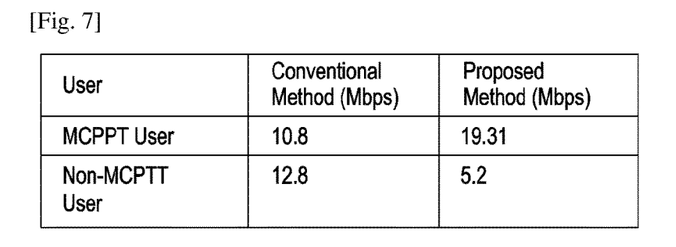
FIGS. 7 and 8 present the download and upload throughputs for MCPTT users using conventional methods and proposed methods, according to embodiments as disclosed herein.
Figure 8:
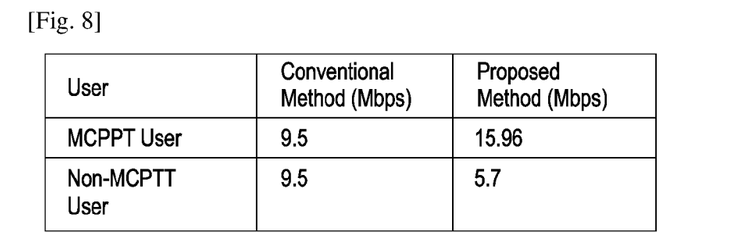
Figure 9:
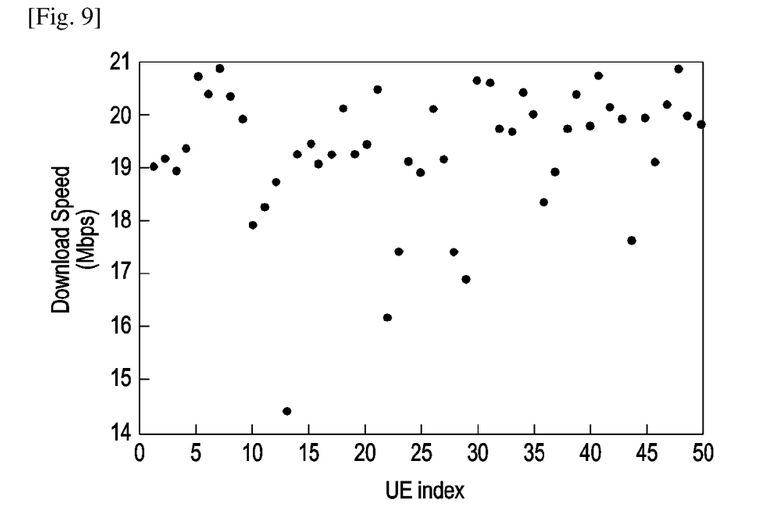
FIG. 9 depicts the download Speed for all the 50 UEs with MCPTT traffic on evaluating the performance of MCPTT method with an LTE simulator using OPNET, according to embodiments as disclosed herein.
Figure 10:
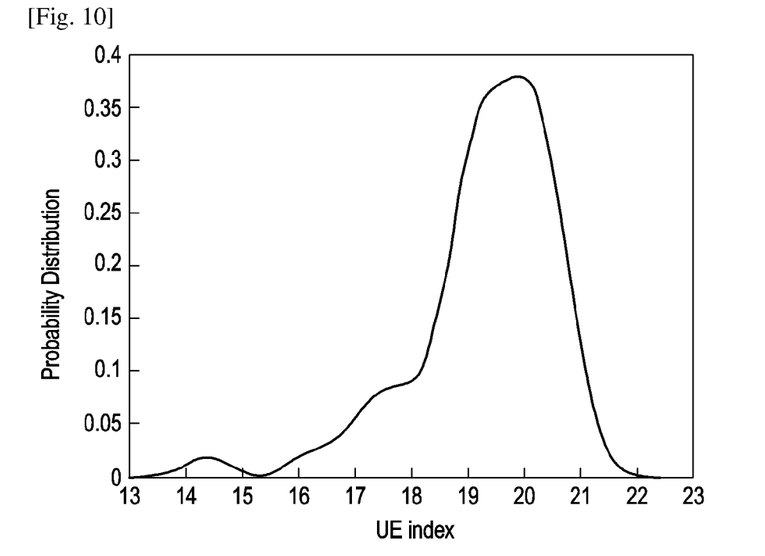
FIG. 10 depicts the probability distribution of the download speed on evaluating the performance of MCPTT method with an LTE simulator using OPNET, according to embodiments as disclosed herein.

FIG. 7 and FIG. 8 present the download and upload throughputs for MCPTT users using conventional methods and proposed methods. The results show up to 79% improvements in download speeds and up to 68% improvements in upload speeds using the proposed priority scheduling method for MCPTT users. The download speed per MCPTT user is depicted in FIG. 9 and the probability distribution in FIG. 10. The results also show the normal-like probability distribution for the download speeds of MCPTT users with the mean value of 19.31 Mbps.

Embodiments herein can achieve up to 79% higher download speed and 68% higher upload speed as compared to the existing methods.

Embodiments herein enable the MCPTT system to perform in a dynamic, delay-intolerant, and highly responsive manner. Further, embodiments herein enable the MCPTT system to identify the potential of all the stakeholders and use them to better serve the needy, be accident-dependent, and not first responder dependent.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

The invention claimed is:

1. A method for access prioritization by a device in a mission critical push to talk (MCPTT) network, comprising:
    detecting an occurrence of an emergency in a location of a mission critical services (MCX) zone;
    detecting presence of at least one first responder device for the emergency in a close proximity from the location of the emergency;
    determining distance of the at least one first responder device from the location of the detected emergency; and
    prioritizing in the location of the detected emergency, an access to the MCPTT network for at least one user equipment (UE) other than the at least one first responder device, if the at least one first responder device is at a distance more than a pre-determined distance from the location of the detected emergency.

2. The method of claim 1, wherein the method further comprises prioritizing in the location of the detected emergency, the access to the MCPTT network for the at least one first responder device, if the at least one first responder device is at a distance within the pre-determined distance from the location of the detected emergency.

3. The method of claim 1, wherein detecting the presence of the at least one first responder device for the emergency in the close proximity from the location of the emergency comprises calculating a distance of the at least one first responder device from the location of the detected emergency and time required by the at least one first responder device to reach the location of the detected emergency.

4. The method of claim 1, wherein the at least one user equipment is in one of an idle mode and a connected mode.

5. The method of claim 4, wherein the method further comprises prioritizing the at least one UE device based on one or more of a channel quality detector (CQI) value, a packet delay budget, a quality of service class identifier (QCI) value, a buffer occupancy, and a token priority, if the at least one UE is in the connected mode.

6. The method of claim 1, wherein the at least one prioritized UE device is included in at least one of a plurality of MCX group calls.

7. The method of claim 1, wherein the method further comprises, on detecting the emergency, sending a request to change a MCPTT user priority to a mobility management entity (MME).

8. The method of claim 1, wherein the method further comprises receiving, from the at least one first responder, an "RRC Connection Request" message with a logical channel ID (LCID) value setting "01110" and an establishment cause value set to a mcs-PriorityAccess.

9. A method for access prioritization by a gNodeB in a mission critical push to talk (MCPTT) network, comprising:
receiving, from at least one user equipment (UE) device, a radio resource control (RRC) connection request comprising an indication that a request for one of establishing and resuming a RRC connection is for mission critical services;
prioritizing the RRC connection request with an indication having mission critical service and establishing access connection over a plurality of RRC connection requests from other devices in the MCPTT network.

10. The method of claim 9, wherein the indication to prioritize the RRC connection request comprises setting an establishment cause value as a mcs-PriorityAccess.

11. The method of claim 9, further comprising prioritizing the at least one user equipment (UE) device in a connected mode in the MCPTT network,
wherein prioritizing the at least one user equipment (UE) device in the connected mode comprises:
receiving signaling from the at least one UE, with a user buffer occupancy;
calculating a priority metric value in a media access control (MAC) layer, wherein the priority metric value is allocated for each user in the MCPTT network;
selecting candidates based on a number of schedulable users; and
allocating downlink resources and updating buffer occupancy status.

12. The method of claim 11, further comprising calculating the priority metric value based on one or more of a channel quality detector (CQI) value, packet delay budget, quality of service class identifier (QCI) value, buffer occupancy, and token priority.

13. A device for access prioritization in a mission critical push to talk (MCPTT) network, comprising:
at least one processor configured to:
detect an occurrence of an emergency in a location of a mission critical services (MCX) zone;
detect presence of at least one first responder device for the emergency in a close proximity from the location of the emergency;
determine distance of the at least one first responder device from the location of the detected emergency; and
prioritize in the location of the detected emergency, an access to the MCPTT network for at least one user equipment (UE) other than the at least one first responder device, if the at least one first responder device is at a distance more than a pre-determined distance from the location of the detected emergency.

14. The device of claim 13, wherein the at least one processor is further configured to prioritize in the location of the detected emergency, the access to the MCPTT network for the at least one first responder device, if the at least one first responder device is at a distance within the pre-determined distance from the location of the detected emergency.

15. The device of claim 13, wherein the at least one processor is further configured to calculate a distance of the at least one first responder device from the location of the detected emergency and time required by the at least one first responder device to reach the location of the detected emergency.

16. The device of claim 13, wherein the at least one user equipment is in one of an idle mode and a connected mode.

17. The device of claim 13, wherein the at least one processor is further configured to prioritize the at least one UE based on one or more of a channel quality detector (CQI) value, a packet delay budget, a quality of service class identifier (QCI) value, a buffer occupancy, and a token priority, if the at least one UE is in the connected mode.

18. The device of claim 13, wherein the at least one prioritized UE device is included in at least one of a plurality of MCX group calls.

19. The device of claim 13, wherein the at least one processor is further configured to, on detecting the emergency, send a request to change a MCPTT user priority to a mobility management entity (MME).

20. The device of claim 13, wherein the at least one processor is further configured to receive, from the at least one first responder, an "RRC Connection Request" message with a logical channel ID (LCID) value setting "01110" and an establishment cause value set to a mcs-PriorityAccess.

* * * * *